3,013,076
PREPARATION OF TETRAMETHYLHYDRAZINE
David Horvitz, Landover, Md., assignor to National Distillers and Chemical Corporation, a corporation of Virginia
No Drawing. Filed Oct. 22, 1956, Ser. No. 617,664
9 Claims. (Cl. 260—583)

This invention relates to a new and improved method for the preparation of methyl-substituted hydrazine. More particularly, the invention pertains to the preparation of tetramethylhydrazine and azeotropes thereof.

Considerable effort has been expended in the past in an attempt to synthesize tetramethylhydrazine. A review of this effort is set forth in the paper of Klages et al., "Ann.," 547, 1–38 (1941). Many different procedures were tried, including the reaction of formaldehyde with hydrazine in the presence of formic acid, but no traces of tetramethylhydrazine were obtained. Recently, Class et al. in the "Journal of the American Chemical Society," 75, 2937–9 (1953) reported the preparation of tetramethylhydrazine by the reduction of 1,2-diformylhydrazine with lithium aluminum hydride. Yields of only about 15% were obtained by the Class et al. method.

It has now been found that tetramethylhydrazine and a water azeotrope thereof may be readily prepared in considerably improved yields by a less costly and more easily operated method. In general, the process of the invention comprises reacting either trimethylhydrazine or symmetrical dimethylhydrazine with formic acid and formaldehyde or paraformaldehyde. More specifically, the process comprises first reacting the trimethylhydrazine or symmetrical dimethylhydrazine with the formic acid, and then reacting the resulting products with an aqueous solution of formaldehyde or with paraformaldehyde at a temperature conducive to carbon dioxide evolution. When the evolution of carbon dioxide has substantially ceased, excess formaldehyde and formic acid are distilled from the reaction mixture. An alkaline material such as sodium hydroxide is added to the distilled reaction mixture, and an azeotrope of tetramethylhydrazine and water, which boils at about 69°–70° C. under atmospheric pressure and contains about 3% water, is recovered by fractional distillation. This azeotrope may be broken up by any of the conventional techniques. For example, a dehydrating agent such as barium oxide, calcium oxide, sodium hydroxide, potassium hydroxide, and the like may be employed. It will be understood that other suitable means for recovering the tetramethylhydrazine from the azeotropic mixture may also be utilized without departing from the scope of the present invention. Pure tetramethylhydrazine recovered as described above has a boiling point of about 74.3° C. at 760 mm. pressure.

The trimethylhydrazine and the symmetrical dimethylhydrazine used in the process of this invention may be obtained by methods described by Class et al., supra, and Hatt, "Organic Synthesis," Vol. II, p. 231 (1943), respectively. Though either trmiethylhydrazine or symmetrical dimethylhydrazine may be successfully employed in the preparation of tetramethylhydrazine, the latter starting material has been found to give comparatively poorer yields. In general, a mol ratio of formic acid to trimethylhydrazine of about 1:1 to 6:1 or higher, preferably about 2:1 to 6:1, will be employed in the process of this invention. Ordinarily a mol ratio of about 1:1 or slightly more of formaldehyde or paraformaldehyde to trimethylhydrazine will be utilized. However, a mol ratio of about 1:1 to 2:1 or higher may also be effectively employed. The reaction with symmetrical dimethylhydrazine is generally carried out with the same proportions of ingredients based on the number of methyl groups to be introduced. Since two methyl groups must be introduced per mol of symmetrical dimethylhydrazine, it is necessary to use a mol ratio of formaldehyde or paraformaldehyde to symmetrical dimethylhydrazine of about 2:1 to 4:1 or higher, preferably 2:1 or a slight excess, and a mol ratio of formic acid to symmetrical dimethylhydrazine of about 2:1 to 12:1 or higher, preferably about 4:1 to 12:1.

It has been further found that appreciable amounts of water may be present in the reaction mixture without deleteriously affecting the yield. For example, tetramethylhydrazine has been successfully prepared from reaction mixtures containing as much as 15 mls. to 80 mls. of water per mol of trimethylhydrazine. The advantages of being able to operate the process under such variable water content conditions are obvious. Many of the reactants, for example, are more easily handled or commercially available as aqueous solutions.

In carrying out the process of the invention, the trimethylhydrazine or symmetrical dimethylhydrazine is mixed with the formic acid at any temperature between the freezing and boiling points of the solution, but preferably about 10° to 75° C., with stirring. The formaldehyde or paraformaldehyde is then added to the reaction at a temperature of either 50° C. or lower with cooling and stirring or at the reaction temperature of about 50° to 100° C. After heating the reaction mixture to a temperature of about 50° to 100° C., the mixture is heated to its reflux temperature and maintained at this temperature until carbon dioxide evolution substantially ceases. Ordinarily, refluxing is maintained for about 5 to 30 minutes. The resulting mixture is then cooled to ambient temperature and acidified by the addition of concentrated hydrochloric acid. It will be understood that various acids such as sulfuric acid, phosphoric acid, oxalic acid, etc. may be employed in place of the hydrochloric acid. The number of mols of acid added generally will be equivalent to the number of mols of trimethylhydrazine or symmetrical dimethylhydrazine employed.

Following the addition of the acid, the resulting mixture is distilled at atmospheric pressure or at any reduced pressure to remove unreacted formic acid and formaldehyde or paraformaldehyde. It is also possible to directly distill the resulting mixture, without the addition of acid, to remove the unreacted material. The residue is then treated with a sufficient amount of an alkaline reagent such as sodium hydroxide, calcium hydroxide, calcium oxide, and the like to make the residue solution alkaline. The alkaline residue is distilled in a fractionating column, and a fraction boiling between about 69° to 70° C. is recovered. This fraction is an azeotrope of tetramethylhydrazine and water (about 3%), and it may be recovered and used as such. It is also within the scope of this invention, however, to break down the azeotrope and recover pure tetramethylhydrazine. As previously discussed, any known method for breaking down the tetramethylhydrazine-water azeotrope may be employed. Thus, for example, the azeotrope may be refluxed over barium oxide for about 0.1 to 3 hours, and then fractionally distilled to recover a tetramethylhydrazine fraction boiling about 74.3° C. at 760 mm. pressure.

The following examples illustrate various preferred embodiments of the invention.

*Example I*

74 grams of trimethylhydrazine were added to 154 grams of 90% formic acid with cooling and stirring, the solution being maintained at about room temperature. After all the trimethylhydrazine had been introduced, 37 grams of paraformaldehyde were added in small portions while the temperature of the reaction was maintained at about 10° C. with cooling. After all the paraformaldehyde had been added, the reaction mixture was heated and it was observed that at about 50° C. an exothermic reaction commenced which brought the temperature up rapidly and at the same time a considerable evolution of carbon dioxide began. The heating was continued, and the temperature was finally brought to the point where refluxing of the solution commenced. When this point had been reached, the carbon dioxide evolution had substantially ceased. Refluxing was continued for 10 minutes. The solution was then cooled, and to it were added 92 mls. of concentrated hydrochloric acid. The solution was distilled under a vacuum of 20 mm. of mercury, and the distillate was taken over until a head temperature of about 50° C. was reached. The residue was cooled and treated with 50% sodium hydroxide solution until it was alkaline. This solution was then distilled through a fractionating column and a fraction boiling between 69° and 70° C. recovered. This fraction was an azeotrope of tetramethylhydrazine and water. This azeotrope was then refluxed over barium oxide for about one hour and then fractionally distilled to give 40 grams of tetramethylhydrazine analyzing better than 99% pure. The yield was 45.5%.

*Example II*

78 grams of trimethylhydrazine were added with cooling to 162 grams of 90% formic acid as in Example I. This solution was then brought to 70° C. and 39 grams of paraformaldehyde were added in small portions while the temperature was maintained between 70° and 80° C. Carbon dioxide was evolved throughout the course of the addition. After the addition of the paraformaldehyde was completed, the reaction mixture was heated to reflux temperature and maintained at reflux for five minutes. The solution was cooled and to it was added 95 ml. of concentrated hydrochloric acid. As in Example I, the excess formic acid and formaldehyde were distilled over under vacuum and the residue was treated with sodium hydroxide. Fractionation from the alkaline residue gave 61 grams of the tetramethylhydrazine azeotrope, which on drying with barium oxide produced 57 grams of pure tetramethylhydrazine, a yield of 61.5%.

*Example III*

171 grams of trimethylhydrazine were added to 688.5 grams of 90% formic acid as in Example I. To this solution with stirring and cooling were added slowly 200.7 grams of 36.3% formaldehyde solution, the temperature being maintained at about 10° C. The mixture was then slowly heated until it reached reflux temperature. It was observed that carbon dioxide began to evolve when a temperature of about 50° C. was reached and that most of the carbon dioxide evolution had ceased when the reflux temperature had been reached. The solution was refluxed for about 10 minutes; the solution was then cooled and 204 ml. of concentrated HCl added to it. The solution was then distilled under vacuum as in Example I, and the resulting residue was treated with sodium hydroxide. Employing the purification procedure described in Example I, there was obtained 121 grams of pure tetramethylhydrazine corresponding to a yield of about 59.5%.

*Example IV*

15 grams of symmetrical dimethylhydrazine were added dropwise to 76 grams of 90% formic acid at about 10° C. To this solution were added 16.5 grams of paraformaldehyde while the temperature was maintained at 0° to 10° C. 40 ml. of water were added and the solution was heated slowly to reflux temperature. As in the previous cases, carbon dioxide evolution was observed between 50° and 60° C. By the time reflux had been reached, very little carbon dioxide was still evolving. The solution was refluxed 5 minutes and cooled. 30 ml. of concentrated hydrochloric acid were added and the solution was distilled under vacuum as in the previous cases. The residue was made alkaline with sodium hydroxide, and the tetramethylhydrazine was obtained as described in Example I. 1.5 grams of pure tetramethylhydrazine were obtained, corresponding to a yield of 6.8%.

*Example V*

Following the procedure outlined in Example IV, unsymmetrical dimethylhydrazine was employed in place of symmetrical dimethylhydrazine. Copious evolution of carbon dioxide occurred, but no product was obtained. Titration of the reaction mixture, following carbon dioxide evolution, with potassium iodate indicated the absence of any hydrazinic compound.

The foregoing examples show that by following the process of the invention outstanding yields of tetramethylhydrazine are readily obtained. As previously discussed, either pure tetramethylhydrazine or a water azeotrope thereof may be recovered. These products may be employed for such diverse uses as fuels, antioxidants, pharmaceutical intermediates, reducing agents, intermediate for wetting agents, etc.

It will be understood that the reactants and operating conditions set forth in the foregoing specific embodiments may be varied within the limits indicated in the more general description of the invention.

What is claimed is:

1. A process for the preparation of tetramethylhydrazine which comprises reacting a methyl-substituted hydrazine compound selected from the group consisting of trimethylhydrazine and symmetrical dimethylhydrazine with formic acid, at a mol ratio of the formic acid to the hydrazine compound of about 1:1 to 12:1, and an aldehyde compound selected from the group consisting of formaldehyde and paraformaldehyde, at a mol ratio of the aldehyde compound to the hydrazine compound of about 1:1 to 4:1, at a temperature of about 10° to 100° C., maintaining said temperature until carbon dioxide evolution substantially ceases, and then recovering tetramethylhydrazine from the resulting reaction products.

2. The process of claim 1 wherein said methyl-substituted hydrazine is trimethylhydrazine.

3. The process of claim 1 wherein said methyl-substituted hydrazine is symmetrical dimethylhydrazine.

4. The process of claim 1 wherein said aldehyde compound is formaldehyde.

5. The process of claim 1 wherein said aldehyde compound is paraformaldehyde.

6. The process of claim 1 wherein said temperature is about 50° to 100° C.

7. A process for the preparation of tetramethyl-hydrazine which comprises reacting a methyl-substituted hydrazine compound selected from the group consisting of trimethylhydrazine and symmetrical dimethylhydrazine with formic acid, at a mol ratio of the formic acid to the hydrazine compound of about 1:1 to 12:1, and an aldehyde compound selected from the group consisting of formaldehyde and paraformaldehyde, at a mol ratio of the aldehyde compound to the hydrazine compound of about 1:1 to 4:1, at a temperature of about 50° to 100° C., adding an acid selected from the group consisting of hydrochloric, sulphuric, phosphoric, and oxalic to the resulting reaction product mixture, distilling said acidified reaction product mixture to remove unreacted reactants, adding to the resulting residue an alkaline material selected from the group consisting of sodium hydroxide, calcium hydroxide, and calcium oxide, and then distilling the alkaline residue to recover a tetramethylhydrazine-water azeotrope.

8. The process of claim 7 wherein said acid is hydrochloric acid.

9. The process of claim 7 wherein said alkaline material is sodium hydroxide.

References Cited in the file of this patent

UNITED STATES PATENTS 2,739,981     Szabo et al. ------------ Mar. 27, 1956

OTHER REFERENCES

Klages et al., "Ann.," 547, pp. 1–38 (1941).

"Organic Reactions," volume V, pages 302–8 and 318 (1949).

Class et al., Jour. Amer. Chem. Soc., Vol. 75 (1953), pages 2937–2939.